(No Model.)
J. W. TITUS.
COMBINED ROLLER, HARROW, AND MARKER.
No. 418,828. Patented Jan. 7, 1890.
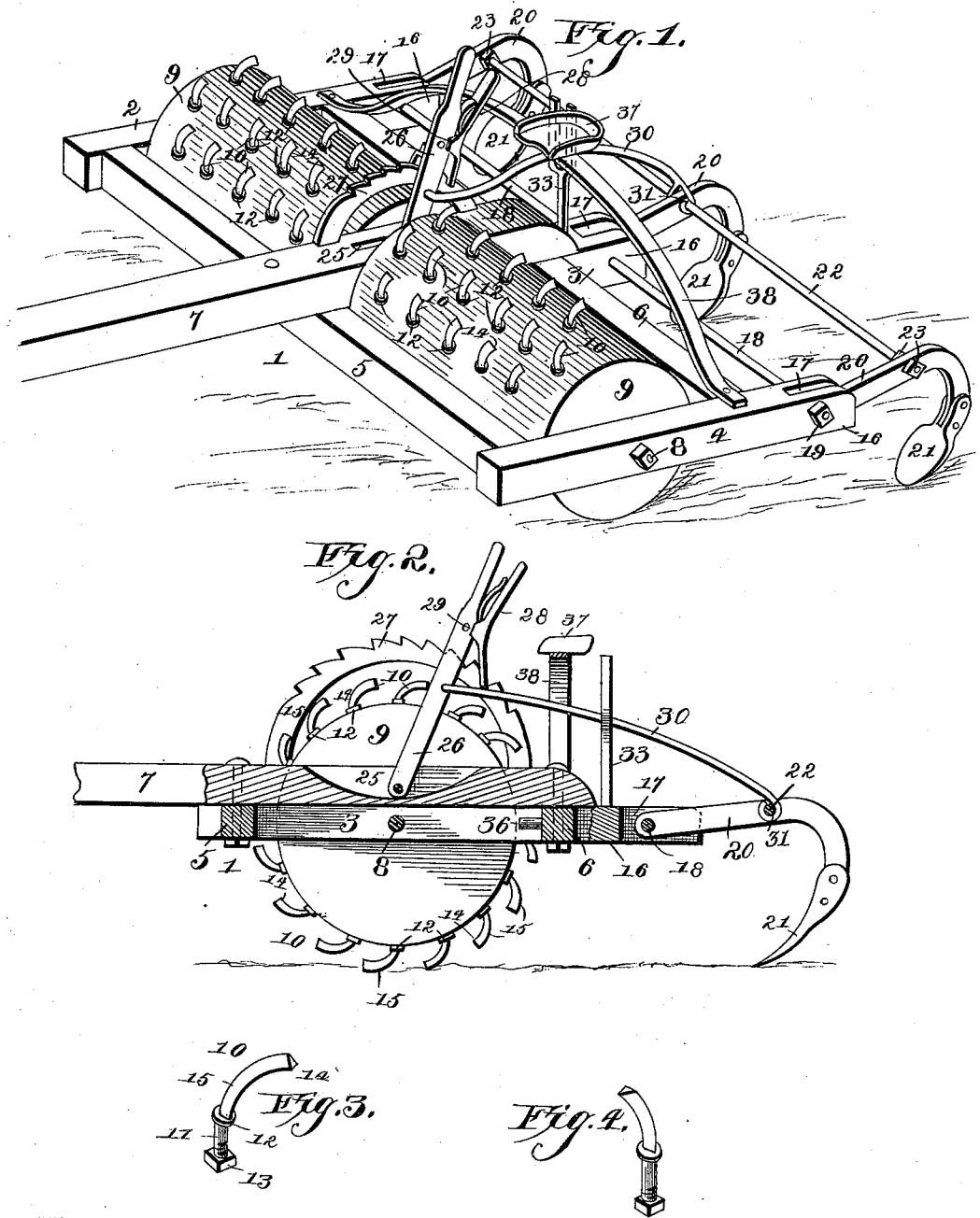
Witnesses:
Henry J. Dieterich
W. S. Duvall
Inventor
John W. Titus
By his Attorneys,
C. A. Snow & Co.

UNITED STATES PATENT OFFICE.

JOHN W. TITUS, OF ECKERTY, INDIANA.

COMBINED ROLLER, HARROW, AND MARKER.

SPECIFICATION forming part of Letters Patent No. 418,828, dated January 7, 1890.

Application filed May 29, 1889. Serial No. 312,554. (No model.)

*To all whom it may concern:*

Be it known that I, JOHN W. TITUS, a citizen of the United States, residing at Eckerty, in the county of Crawford and State of Indiana, have invented a new and useful Combined Roller, Harrow, and Marker, of which the following is a specification.

This invention has relation to a combined roller, harrow, and marker adapted to be used previous to planting; and among the objects in view are to provide a device of the class described, consisting of as few parts as possible, cheaply and strongly constructed, and adapted to crush, harrow, and mark the rows for subsequent planting of the grain, said marking mechanism being under control of the driver, whereby the same may be elevated past stumps and other obstructions and again lowered or elevated at the end of each trip.

The invention consists in certain features of construction hereinafter specified, and particularly pointed out in the claim.

Referring to the drawings, Figure 1 is a perspective of a combined harrow, roller, and marker constructed in accordance with my invention, and Fig. 2 is a longitudinal vertical section of the same. Fig. 3 is a detail of the cultivator-tooth, and Fig. 4 a modification of the same.

Like numerals of reference indicate like parts in all the figures of the drawings.

1 represents the frame, and the same in this instance consists of three longitudinal bars 2, 3, and 4, connected at their forward ends by a cross-bar 5, and intermediate their forward and rear ends by a similar bar 6.

Secured to the central bar 3 is the forwardly-projecting draft-bar 7, which terminates at about a point opposite the intersecting cross-bar 6.

Journaled in the longitudinal bars 2, 3, and 4 upon shafts 8, and between the bars 5 and 6 are rollers 9, the peripheries of which are provided with cultivator-teeth 10, arranged in parallel rows and projecting therefrom. The teeth 10 in this instance each consists of a shank portion 11, having a flange 12 intermediate its ends, adapted to bear upon the outer surface of the roller, and is bound thereupon by a tappet 13, the outer end of the tooth being curved and rearwardly disposed, as at 14, and having a curved cutting-edge 15.

If desired, and as shown in Fig. 4, the tooth may be oppositely disposed and have its inner or concaved edge sharpened and terminate in a point; but the construction first described I find preferable for many reasons.

By reason of the location of the bars 6 intermediate the ends of the longitudinal bars 2, 3, and 4, said latter bars project to the rear and form arms 16, which are bifurcated, as at 17, and provided with a shaft 18, the ends of which are provided with nuts 19, by which the shaft is maintained snugly in position.

Upon the shaft 18, and within each of the bifurcations, is pivotally mounted a cultivator-standard 20, having a cultivator or marking tooth 21, depending at the rear of the harrow, said standards being curved, so that the markers depend into the path over which the harrow has passed, and are connected for uniform movement by means of a tie-bar 22, passing through the series and provided with clamping-bolts 23, embracing each of the two surfaces of said standards.

Intermediate the two rollers and pivoted in the draft-beam, which is slotted, as at 25, for the purpose, is located a hand-lever 26, and at the side of the same and straddling the slot is a curved sector 27, over which rides and is adapted to mesh a spring-pressed locking-pawl 28, pivoted to the hand-lever, as at 29.

Pivotally connected with the hand-lever 26 is a curved bar 30, the rear end of which is loosely connected, as at 31, to the tie-bar 22, and intermediate its connection with the tie-bar and the hand-lever there is provided a bifurcated guiding-post 33, projecting upwardly from the central of the series of arms 16.

If desired, the inner edges of each of the bars 6 may be provided with a series of teeth 36, alternately arranged with those of the rollers and designed to disengage any grass, leaves, twigs, and other débris caught by the harrow-teeth.

37 represents the driver's seat, which may be supported in any suitable manner upon the frame 1. In this instance I provide opposite curved risers 38, projecting outwardly from the corners of the frame.

The operation of my invention is as follows:

The roller is intended for use especially prior to seeding, and the teeth therein will thoroughly break any hard clods of earth and at the same time the rollers aid in the pulverization, said rollers being arranged at a width agreeing to the distance apart the rows of planting are to occur. The plows are under the direct control of the operator, and are designed to penetrate the surface sufficiently far to mark the rows in which the planting is to be subsequently done. By the manipulation of the lever the markers may be raised to pass over obstructions, as the roots of trees, stones, &c.

By experience I have found that this roller may be beneficially used on meadows having become moss-grown, in which case the sod is cut and left as it was before cutting, the roller serving to press the earth back to its original place, whereby I obtain an advantage over the usual form of harrows, in that the latter indiscriminately tears up and lacerates the grass, thus destroying the same to a very material extent.

Having described my invention, what I claim is—

The longitudinal bars 3, 2, and 4, connected by the transverse bars 5 and 6 and terminating beyond the transverse bars in the rearwardly-projecting bifurcated arms 16, in combination with the rod 18, passing through the bifurcated arms of the longitudinal bars and provided with the nuts 19, the curved cultivator-standards 20, having the shovels 21, mounted on the shaft 18 in each of the bifurcations, the tie-bar 22, connecting each of the standards, and of pivoted lever 26, having the releasing-pawl 28, the curved sector 27, adapted to engage the pawl, and the curved operating-bar 30 and the bifurcated support for supporting the same, said bar being loosely connected at one end with the tie-rod connecting the marker-standards and at its opposite end with the lever, substantially as specified.

In testimony that I claim the foregoing as my own I have hereto affixed my signature in presence of two witnesses.

JOHN W. TITUS.

Witnesses:
J. W. SNYDER,
J. A. WHEATLEY.